United States Patent [19]

Denneau et al.

[11] Patent Number: 5,414,740

[45] Date of Patent: May 9, 1995

[54] SYNCHRONOUS COMMUNICATION SYSTEM HAVING MULTIPLEXED INFORMATION TRANSFER AND TRANSITION PHASES

[75] Inventors: Monty M. Denneau, Brewster; Bruce D. Gavril, Chappaqua; Peter H. Hochschild, New York, all of N.Y.; Craig B. Stunkel, Bethel, Conn.

[73] Assignee: International Business Machines Corporation, Armonk, N.Y.

[21] Appl. No.: 992,200

[22] Filed: Dec. 17, 1992

[51] Int. Cl.[6] ............................................. H04L 7/00
[52] U.S. Cl. .................................... 375/371; 375/357; 370/100.1
[58] Field of Search ............................. 375/118, 100; 370/100.1, 102, 105, 108, 111, 110.1, 105.3

[56] References Cited

U.S. PATENT DOCUMENTS

| | | | |
|---|---|---|---|
| 4,225,919 | 9/1980 | Kyu et al. | 364/200 |
| 4,261,035 | 5/1981 | Raymond | 364/200 |
| 4,271,509 | 6/1981 | Brolin | 370/110 |
| 4,542,504 | 9/1985 | Moul et al. | 370/105.3 |
| 4,581,746 | 4/1986 | Arnold | 370/111 |
| 4,745,601 | 5/1988 | Diaz et al. | 370/110.1 |
| 4,752,940 | 6/1988 | Graham | 370/111 |
| 4,792,949 | 12/1988 | Virdee et al. | 370/112 |
| 4,841,550 | 6/1989 | George et al. | 375/118 |
| 4,860,285 | 8/1989 | Miller et al. | 370/100.1 |
| 4,888,768 | 12/1989 | Michener | 370/102 |
| 4,943,942 | 7/1990 | Dunnion | 375/8 |
| 5,003,558 | 3/1991 | Gregg | 375/118 |
| 5,005,171 | 4/1991 | Modisette, Jr. et al. | 370/110.1 |
| 5,007,070 | 4/1991 | Chao et al. | 375/118 |
| 5,020,081 | 5/1991 | Allen et al. | 375/118 |
| 5,027,349 | 6/1991 | Thorne | 370/85.1 |
| 5,046,067 | 9/1991 | Kimbrough | 370/110.1 |
| 5,051,992 | 9/1991 | Taniguchi et al. | 370/110.1 |
| 5,208,810 | 5/1993 | Park | 370/100.1 |

*Primary Examiner*—Stephen Chin
*Assistant Examiner*—Timothy J. May
*Attorney, Agent, or Firm*—Marc D. Schechter; Robert P. Tassinari, Jr.

[57] ABSTRACT

A communication system segment having phase multiplexing. A first communication station contains a data source which sequentially outputs a series of data signals during a series of clock periods. The data source outputs one data signal from the series during each clock period. The first communication station also contains a transition buffer which has an input connected to the output of the data source. The transition buffer has a first-in, first-out mode in which the transition buffer stores a series of Q data signals output from the data source during the most recent Q clock periods, where Q is an integer greater than zero. A second communication station contains a data receiver which sequentially inputs a series of data signals during a series of clock periods. The data receiver inputs one data signal from the series during each clock period. A communication line connects the output of the data source to the input of the data receiver. A synchronizer may be provided for synchronizing occurrences of information transfer phases of the first communication station with occurrences of corresponding information transfer phases of the second communication station to a synchronization offset X equal to the number of clock periods of the system clock by which occurrences of each phase of the second communication station lag occurrences of the corresponding phase of the first communication station.

20 Claims, 10 Drawing Sheets

SYNCHRONOUS COMMUNICATION SYSTEM HAVING MULTIPLEXED INFORMATION TRANSFER AND TRANSITION PHASES

BACKGROUND OF THE INVENTION

The invention relates to interconnect networks for parallel processing systems. In a parallel processing system, a number of processing nodes are interconnected and operated as a single, coherent computing machine.

Generally, a switching network comprises a multitude of identical integrated circuit switch elements that are interconnected in a manner which provides a high bandwidth, low latency communication path between any pair of processing nodes. The size of networks of this type can be large. The number of switch elements needed to implement an omega network topology, for example, varies as $(N/n) \log_n N$ where N denotes the number of processing nodes, and 2n is the number of ports associated with a single switch element. Thus, for a switch element having four duplex ports or eight simplex ports (n=4), the number of switch elements needed for a 16,384 node system is 28,672. To further emphasize the size and complexity of these networks, it may be noted that each switch element is generally connected to 2n other switch elements, resulting in a layout and wiring problem of large proportions. Understandably, therefore, such networks are difficult to design and develop, and the diagnosis of even routine hardware or software failures can be a difficult task.

The practical utilization of networks of this size and complexity thus requires that they be serviced entirely under computer control. Such servicing embraces a wide variety of tasks, such as measurement of transmission parameters, initialization of the network, monitoring of individual elements, diagnosis of failures, and error recovery. Existing approaches to meeting this service requirement involve various forms of completely separate service networks that operate effectively in parallel with what may be called the user network. The designations "service" and "user" are chosen to emphasize the distinctly different functions of the two networks. This approach creates a hybrid network that requires additional connectivity at each switch element, and additional wiring. This additional complexity increases the cost of the whole system. Yet, even with a hybrid network, it is still difficult to fully observe individual elements of the user network while the user network is in operation.

SUMMARY OF THE INVENTION

It is an object of the invention to provide a communication system segment, containing two communication stations connected by a communication line, for a dynamically self-servicing, fully observable communication network. It is another object of the invention to provide a communication system segment for use in achieving continuous, full duplex, synchronous information transfer between two communication stations located at an unknown electrical distance from one another and clocked by a common oscillator located at an unknown electrical distance from the two devices. At the same time, the communication system segment uses more than one transmission protocol and/or handles information of various significance, with all protocols and variants of information sharing the same transmission facilities.

It is a further object of the invention to provide a communication system segment which is capable of phase mulitiplexing, in which various instances of different operating phases of station-to-station communication are interleaved to achieve multipurpose information transfer. A communication station is an apparatus that handles the transfer of data between a locally attached source/sink device and a remotely attached communication station of like design that itself supports a similarly attached source/sink device. The term "phase" refers to specific periods of communication station operation characterized by the transfer of phase-specific information, and optionally a phase-specific transmission protocol. Phase-multiplexing allows instances of different phases, performed one at a time in any sequence, to be interleaved without mutual disruption and without loss of data, using common (shared) information transfer facilities. No additional wiring is necessary beyond what is needed for any single phase, and the electrical distance between communication stations can be large relative to how far a signal propagates in a single clock cycle.

It is another object of the invention to provide communication systems segments for a communication network in which an information transfer phase may be suspended throughout the network at any point or points in time, and in which the information transfer phase can be resumed throughout the communication network at any subsequent point or points in time without losing any data belonging to the information transfer phase.

It is a further object of the invention to provide a communication system segment for sequentially propagating a series of data signals over a communication line from a data source to a data receiver, in which the data source may suspend the transmission of data signals at any point or points in time, and in which the data source may resume the transmission of data signals at any subsequent point or points in time, without the data receiver losing any data signals from the data source.

A communication system segment according to the present invention comprises a system clock having a clock period. The system clock generates a clock signal each clock period.

The communication system segment further includes a source communication station comprising a data source having an output for sequentially outputting a series of data signals during a series of clock periods. The data source outputs one data signal from the series during each clock period.

The source communication station further comprises a transition buffer having an input connected to the output of the data source. The transition buffer has a first-in, first-out mode in which the transition buffer stores a series of Q data signals output from the data source during the most recent Q clock periods, where Q is an integer greater than zero.

The communication system segment further comprises a receiving communication station having a data receiver for sequentially inputting a series of data signals during a series of clock periods. The data receiver inputs one data signal from the series during each clock period.

A communication line has an input connected to the output of the data source of the source communication station and has an output connected to the input of the data receiver of the receiving communication station. The communication line propagates data signals from the input of the communication line to the output of the communication line.

In one aspect of the invention, the source communication station has a first information transfer phase, and has a second transfer phase different from the first information transfer phase. The receiving communication station has a first information transfer phase, and has a second information transfer phase different from the first information transfer phase. The communication system further comprises a synchronizer for synchronizing occurrences of the first information transfer phase of the source communication station with occurrences of the first information transfer phase of the receiving communication station, and for synchronizing occurrences of the second information transfer phase of the source communication station with occurrences of the second information transfer phase of the receiving communication station to a synchronization offset X equal to a number of clock periods of the system clock by which occurrences of each phase of the receiving communication station lag occurrences of the corresponding phase of the source communication station.

During occurrences of the first information transfer phase of the source communication station, the transition buffer operates in the first-in, first-out mode.

According to another aspect of the invention, the source communication station has a transition phase in which the data source does not output data signals. The receiving communication station has a transition phase in which the data receiver does not input data signals. During the transition phase of the source communication station, the output of the transition buffer is connected to the input of the communication line, and the Q data signals in the transition buffer are output from the transition buffer in an order which is the same as the order in which the Q data signals were output from the data source to the transition buffer. The synchronizer synchronizes occurrences of the transition phase of the source communication station with occurrences of the transition phase of the receiving communication station such that occurrences of the transition phase of the receiving communication station lag occurrences of the transition phase of the source communication station by the synchronization offset X.

Each occurrence of the first information transfer phase of the source communication station starts with the clock period following the end of each occurrence of the transition phase of the source communication station.

The communication system segment according to the invention has a latency K equal to the number of clock periods of the system clock for a data signal to travel from the output of the data source to the input of the data receiver. The synchronization offset X between the source communication station and the receiving communication station is greater than or equal to the latency K of the communication system segment minus the number Q of data signals stored in the transition buffer, and is less than or equal to the latency K of the communication system segment.

Each data signal on the communication line of the communication system segment according to the invention occupies a data signal length on the communication line. The communication line has a length from the input of the communication line to the output of the communication line of K' data signal lengths. The latency K of the communication system segment is greater than or equal to K'.

In the communication system segment, the synchronizer may comprise, in part, a source station time counter having a value equal to the number of clock periods of the system clock which have elapsed from a starting time, and a receiving station time counter having a value equal to the value of the source station time counter minus the synchronization offset X.

In one aspect of the invention, during the transition phase of the source communication station, the transition buffer input is connected to the transition buffer output. The transition buffer then re-stores the series of Q data signals output from the transition buffer.

The transition buffer may be, for example, a first-in, first-out buffer. Each data signal may comprise, for example, two or more digit signals. Each digit may be, for example, a binary digit. The communication system segment may further comprise a transmit register connecting the output of the data source to the input of the communication line.

Two communication system segments providing full duplex operation may form a communication system stage. A communication system stage according to the present invention comprises a system clock and first and second communication stations. The system clock generates a clock signal each clock period.

Each communication station of the communication system stage comprises a data source having an output for sequentially outputting a series of data signals during a series of clock periods. Each data source outputs one data signal from the series during each clock period. A transition buffer has an input connected to the output of the data source. Each transition buffer has a first-in, first-out mode in which the transition buffer stores a series of Q data signals output from the data source during the most recent Q clock periods, where Q is an integer greater than zero.

Each communication station further comprises a data receiver having an input for sequentially inputting a series of data signals during a series of clock periods. Each data receiver inputs one data signal from the series during each clock period.

The communication system stage further comprises a first communication line having an input connected to the output of the data source of the first communication station, and having an output connected to the input of the data receiver of the second communication station. The first communication line propagates data signals from the input of the first communication line to the output of the first communication line. A second communication line has an input connected to the output of the data source of the second communication station, and has the output connected to the input of the data receiver of the first communication station. The second communication line propagates data signals from the input of the second communication line to the output of the second communication line.

Each communication station has a first information transfer phase, and has a second information transfer phase different from the first information transfer phase. A synchronizer synchronizes occurrences of the first information transfer phase of the first communication station with occurrences of the first information transfer phase of the second communication station to a synchronization offset X equal to a number of clock periods of the system clock by which occurrences of each phase of the second communication station lag occurrences of the corresponding phase of the first communication station.

The synchronizer also synchronizes occurrences of the second information transfer phase of the first communication station with occurrences of the second information transfer phase of the second communication station to the synchronization offset X.

During occurrences of the first information transfer phase of a communication station, the transition buffer of the communication station operates in the first-in, first-out mode.

In the communication system stage according to the invention, each communication station has a transition phase in which the data source does not output data signals, and the data receiver does not input data signals. During the transition phase of the first communication station, the output of the transition buffer of the first communication station is connected to the input of the first communication line. The Q data signals in the transition buffer of the first communication station are output from the transition buffer in an order which is the same as the order in which the Q data signals were output from the data source of the first communication station to the transition buffer of the first communication station.

During the transition phase of the second communication station, the output of the transition buffer of the second communication station is connected to the input of the second communication line. The Q data signals in the transition buffer of the second communication station are output from the transition buffer in an order which is the same as the order in which the Q data signals were output from the data source of the second communication station to the transition buffer of the second communication station.

The synchronizer synchronizes occurrences of the transition phase of the first communication station with occurrences of the transition phase of the second communication station such that occurrences of the transition phase of second communication station lag occurrences of the transition phase of the first communication station by the synchronization offset X.

Each occurrence of the first information transfer phase of a communication station starts with the clock period following the end of each occurrence of the transition phase of the same communication station.

The communication system stage according to the invention has a first latency K1 equal to the number of clock periods of the system clock for a data signal to travel from the output of the data source of the first communication station to the input of the data receiver of the second communication station. The communication system stage has a second latency K2 equal to the number of clock periods of the system clock for a data signal to travel from the output of the data source of the second communication station to the input of the data receiver of the first communication station. According to one aspect of the invention, the quantity $(K1-X)$ equal to the first latency K1 of the communication system stage minus the synchronization offset X between the first communication station and the second communication station (a) is greater than the larger of zero or $(K1+K2-Q)$, where Q is the number of data signals output from each transition buffer during the transition phase, and (b) is less than the smaller of $(K1+K2)$ or Q.

Each data signal on a communication line occupies a data signal length on the communication line. The first communication line has a length from the input of the first communication line to the output of the first communication line of K1' data signal lengths. The second communication line has a length from the input of the second communication line to the output of the second communication line of K2' data signal lengths. The latency K1 of the communication system stage is greater than or equal to K1', and the latency K2 of the communication system stage is greater than or equal to K2'.

The synchronizer may comprise, in part, a first station time counter for the first communication station having a value equal to the number of clock periods of the system clock which have elapsed from a starting time. The synchronizer may also comprise a second station time counter for the second communication station having a value equal to the value of the first station time counter minus the synchronization offset X.

In one aspect of the invention, during the transition phase of a communication station, the input of the transition buffer of the communication station is connected to its own output. The transition buffer re-stores the series of Q data signals output from itself.

The transition buffer may be, for example, a first-in, first-out buffer. Each data signal may comprise two or more digit signals. Each digit may be a binary digit.

Each communication station may further comprise a transmit register connecting the output of the data source of the communication station to the input of a communication line.

A communication system segment and a communication system stage according to the present invention are advantageous because they can be used to provide self-contained means for servicing a large network of dispersed information-transfer or information-processing elements using two distinct, cyclically multiplexed information transfer phases, at least one of which is a continuous information transfer phase. The data signals transmitted in one occurrence of a continuous information transfer phase are related to the data signals transmitted in the immediately preceding occurrence of the information transfer phase.

For example, one information transfer phase may be a continuous phase called a run phase in which "continuous" message information is transmitted. The other information transfer phase may be a distinct phase called a service phase in which service information is transmitted. The data signals transmitted in one occurrence of a distinct information transfer phase are independent of the data signals transmitted in the immediately preceding occurrence of that information transfer phase.

The run phase may be characterized by a packet switching transmission protocol and by message data that is designed to pass through the communication network from a data source to a data receiver. The service phase, in contrast, may be characterized by message data that is circuit switched and designed to service individual elements of the communication network. Thus, by sharing the same transmission resources, service functions can be performed economically and with acceptable impact on system performance.

By providing a transition buffer for receiving the most recent Q data signals output from the data source during a continuous information transfer phase, the continuous information transfer phase may be suspended throughout the communication network at any point or points in time without losing any data belonging to the continuous information transfer phase. Moreover, the continuous information transfer phase can be resumed without loss of data by outputting the Q data signals from the transition buffer onto the communication line immediately prior to resuming the continuous information transfer phase.

DESCRIPTION OF THE PREFERRED EMBODIMENTS

Figure 1:
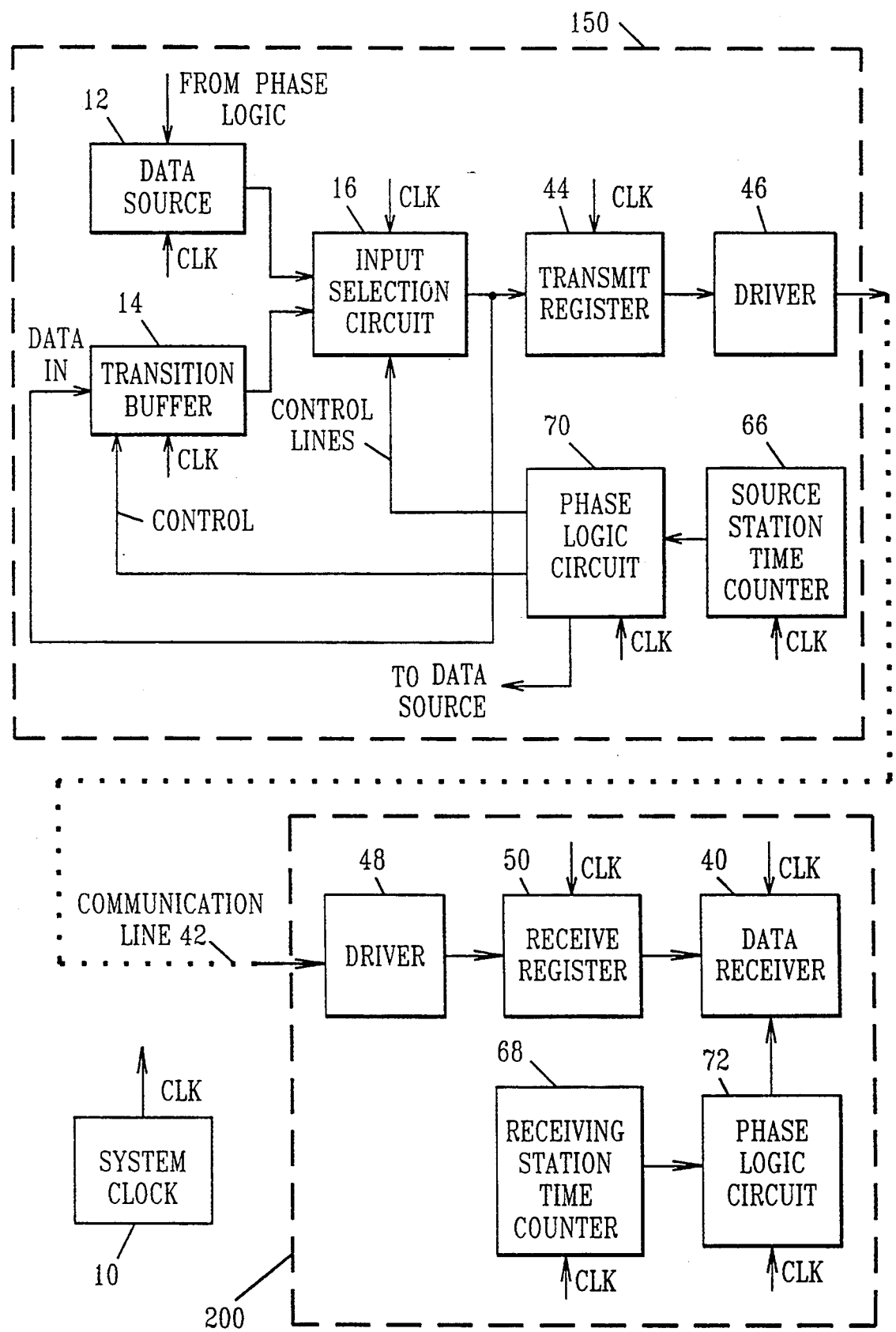
FIG. 1 is a block diagram of an example of a communication system segment according to the present invention.

FIG. 1 is a block diagram of an example of a communication system segment according to tile invention. The communication system segment includes a system clock 10. The system clock generates a clock signal CLK each clock period.

The communication system segment further comprises a source communication station 150 having a data source 12. The data source 12 has an output for sequentially outputting a series of data signals during a series of clock periods. The data source outputs one data signal from the series during each clock period.

Each data signal may comprise, for example, two or more digit signals. Each digit is preferably a binary digit.

More specifically, each data signal may comprise, for example, nine binary digits. Eight of the binary digits in a data signal may represent message or control information. The remaining one digit may identify the data signal as either a message signal or a control signal. If all nine binary digits are zero, the data signal is designated a "null" signal.

The data source may be, for example, a first-in, first-out static random access memory having a memory controller. Alternatively, the data source may be any known adaptor device for interfacing between a computer processor and a communication system. The data source may also be, for example, any known switching device, such as a crossbar switch.

The source communication station 150 further comprises a transition buffer 14o The transition buffer 14 has an input connected to the output of the data source 12. The transition buffer 14 has a first-in, first-out mode in which the transition buffer stores a series of Q data signals output from the data source 12 during the most recent Q clock periods, where Q is an integer greater than zero.

As shown in FIG. 1, the input of transition buffer 14 is connected to the output of data source 12 by way of input selection circuit 16.

Figure 2:
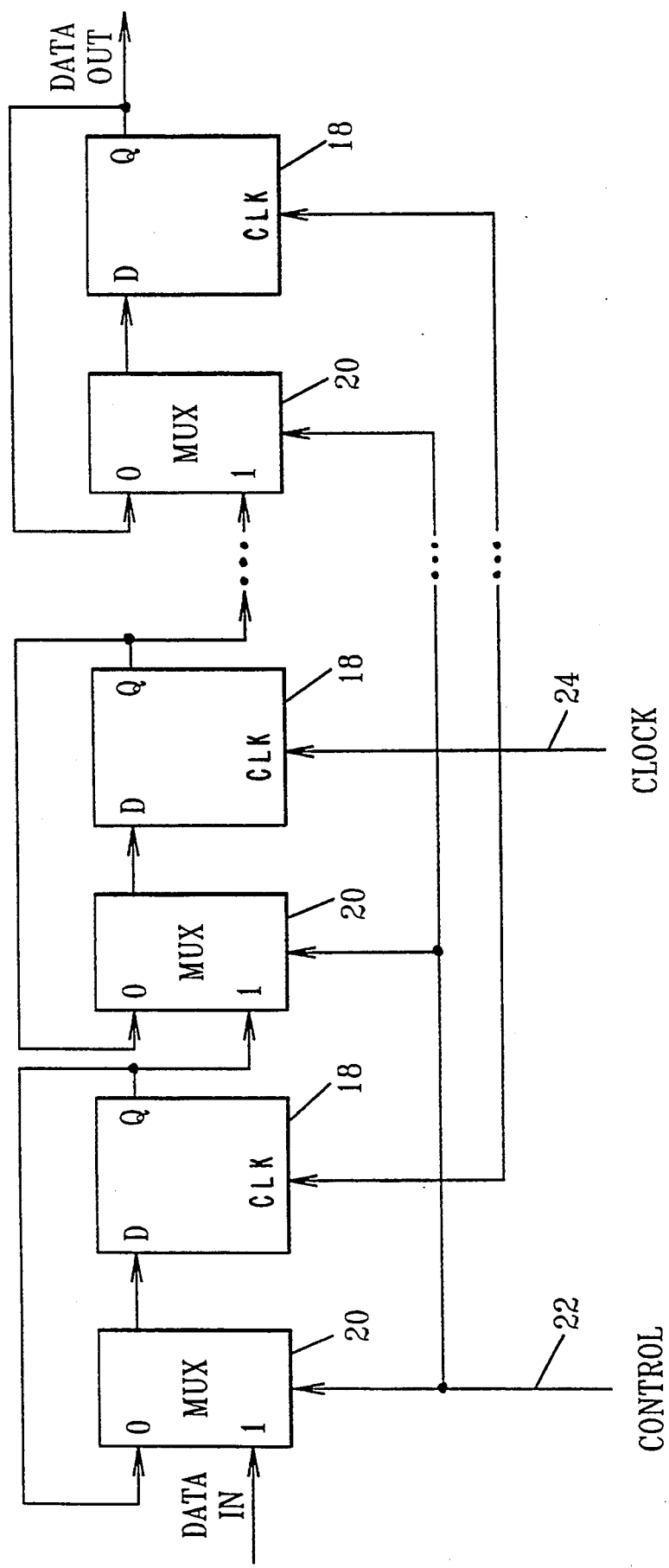
FIG. 2 is a block diagram of an example of a transition buffer for the communication system segment of FIG. 1.

FIG. 2 is a block diagram of an example of the transition buffer 14 of FIG. 1. The transition buffer includes a series of D-type flip-flop circuits 18 interleaved with a series of multiplexors 20. Each multiplexor has a control input connected to a control line 22. Each multiplexor has an output connected to the input of an adjacent D-type flip-flop 18. Each D-type flip-flop 18 has an output which is connected to a "0" input of the preceding multiplexor. The output of each D-type flip-flop 18 is also connected to a "1" input of the following multiplexor 20, or in the case of the last D-type flip-flop 18, to the data output of the transition buffer 14. The "1" input of the first multiplexor 20 is connected to the data input of the transition buffer 14. Each D-type flip-flop 18, and each multiplexor 20 has a clock input connected to a clock line 24. The clock line 24 is connected to the system clock 10 of FIG. 1.

When a control signal having a value of "1" is applied to the control inputs of multiplexors 20 by way of the control line 22, the "1" input of each multiplexor 20 is connected to the multiplexor output. In this "first-in, first-out" mode, during each clock period a data signal is shifted into the transition buffer at one end, a data signal is shifted out of the transition buffer at the other end, and the remaining data signals within the transition buffer are each shifted to the next adjacent D-type flip-flop in the direction of the output of the transition buffer.

When a control signal having a value of "0" is applied to the control inputs of multiplexors 20 by way of control line 22, the "0" input of each multiplexor 20 is connected to the multiplexor output. In this "suspend" mode, during each clock period, each data signal within the transition buffer is fed back into the same D-type flip-flop in which it was stored during the prior clock period. Thus, in the "suspend" mode, the transition buffer 14 stores the last Q information signals received, where Q is the number of D-type flip-flops in the transition buffer 14.

Figure 3:
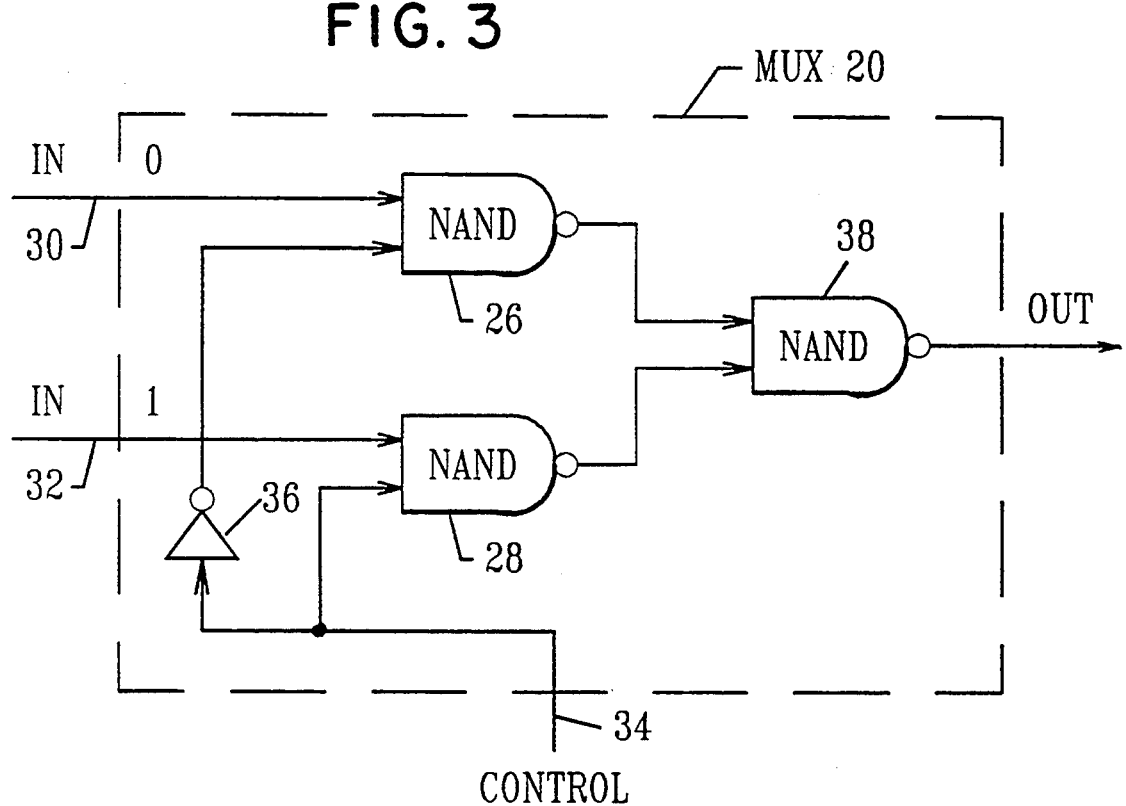
FIG. 3 is a block diagram of an example of a multiplexor for the transition buffer of FIG. 2.

FIG. 3 is a block diagram of an example of the multiplexor 20 of FIG. 2. The multiplexor contains NAND gates 26 and 28, each having data inputs 30 and 32, respectively. Each NAND gate 26 and 28 also has an input connected to mutiplexor control line 34. NAND gate 26 is connected to control line 34 by way of NOT gate 36. NAND gate 28 is directly connected to control line 34. The outputs of NAND gates 26 and 28 are connected to inputs of NAND gate 38 whose output is the output of the multiplexor.

When a "0" signal is applied to the control line 34, the data signal on input line 30 is passed to the output of the multiplexor. When a "1" signal is applied to the control line 34, the data signal on input line 32 is passed to the output of the multiplexor.

Returning to FIG. 1, the communication system segment according to the invention further comprises a receiving communication station 200 having a data receiver 40. The data receiver 40 has an input for sequentially inputting a series of data signals during a series of clock periods. The data receiver 40 inputs one data signal from the series during each clock period.

The communication system segment also includes a communication line 42. The communication line 42 has an input connected to the output of the data source 12 of the source communication station 150. The communication line 42 has an output connected to the input of the data receiver 40 of the receiving communication station 200. The communication line 42 propagates data signals from the input of the communication line to the output of the communication line.

The communication line may be a system of conductors, such as wires, waveguides, or coaxial cables, suitable for conducting electrical or other signals between two or more terminals.

As shown in the example of FIG. 1, the input of communication line 42 is connected to the output of the data source 12 by way of input selection circuit 16, a transmit register 44, and a driver 46.

The transmit register 44 may comprise, for example, nine latches. Each latch may be, for example, a D-type flip-flop circuit. The driver 20 may comprise, for example, nine output drivers for current amplification and impedance matching.

As shown in FIG. 1, the input of the data receiver 40 is connected to the output of the communication line 42 by way of a driver 48 and a receive register 50. The driver 48 may comprise, for example, nine input drivers for current amplification and impedance matching. The receive register 50 may comprise, for example, nine latches. Each latch may be, for example, a D-type flip-flop circuit.

Figure 4:
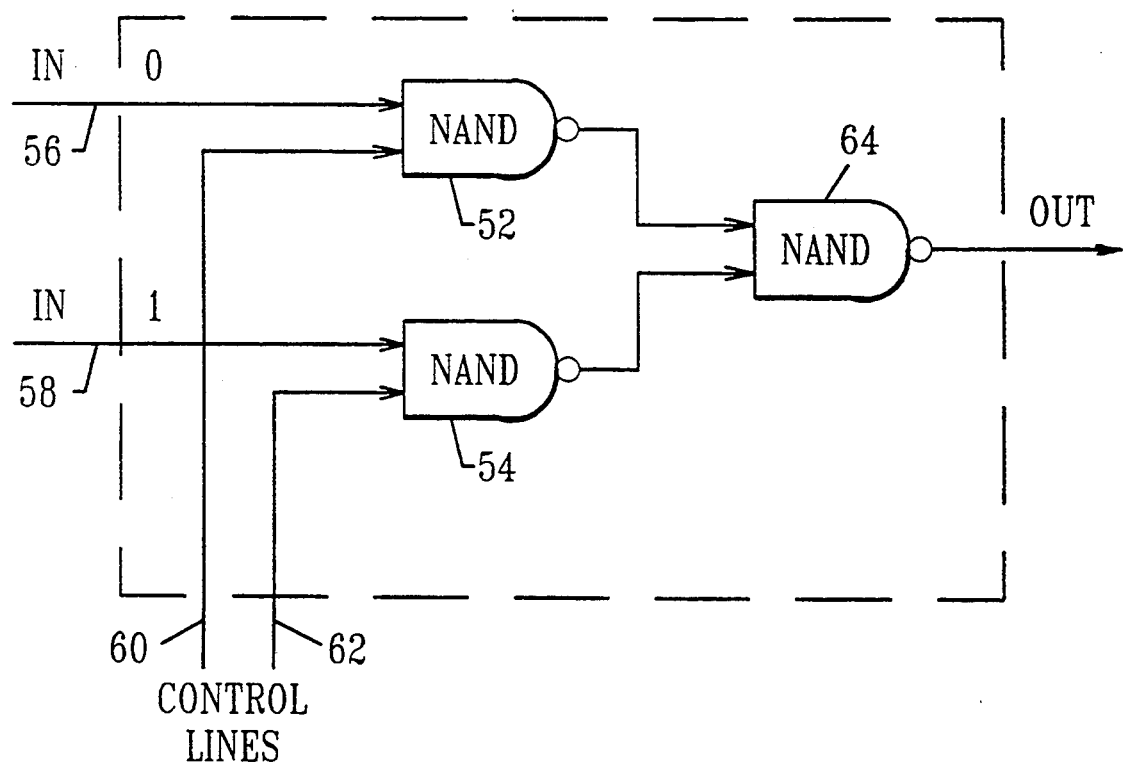
FIG. 4 is a block diagram of all example of an input selection circuit for the communication system segment of FIG. 1.

FIG. 4 is a block diagram of all example of an input selection circuit 16 for the communication system segment of FIG. 1. The input selection circuit contains contains NAND gates 52 and 54, each having data inputs 56 and 58, respectively. Each NAND gate 52 and 54 also has all input connected to a selection control line 60 and 62, respectively. The outputs of NAND gates 52 and 54 are connected to inputs of NAND gate 64 whose output is the output of the input selection circuit 16.

When a "1" signal is applied to the control line 60 and a "0" signal is applied to control line 62, the data signal on input line 56 is passed to the output of the selection circuit 16. When a "1" signal is applied to the control line 62, and a "0" signal is applied to control line 60, the data signal on input line 58 is passed to the output of the selection circuit 16. When "0" signals are applied to both control lines 60 and 62, neither input 56 nor input 58 is passed to the output of the selection circuit 16.

In the communication system segment according to the invention, the source communication station has a first information transfer phase and has a second information transfer phase different from the first information transfer phase. The receiving communication station has a first information transfer phase and has a second information transfer phase different from the first information transfer phase. The system further comprises a synchronizer for synchronizing occurrences of the first information transfer phase of the source communication station with occurrences of the first information transfer phase of the receiving communication station, and for synchronizing occurrences of the second information transfer phase of the source communication station with occurrences of the second information transfer phase of the receiving communication station to a synchronization offset X equal to a number of clock periods of the system clock by which occurrences of each phase of the receiving communication station lag occurrences of the corresponding phase of the source communication station.

During occurrences of the first information transfer phase of the source communication station, the transition buffer operates in the first-in, first-out mode.

The source communication station also has a transition phase in which the data source does not output data signals. The receiving communication station has a transition phase in which the data receiver does not input data signals. During the transition phase of the source communication station, the output of the transition buffer is connected to the input of the communication line, and the Q data signals in the transition buffer are output from the transition buffer in an order which is the same as the order in which the Q data signals were output from the data source to the transition buffer.

The synchronizer synchronizes occurrences of the transition phase of the source communication station with occurrences of the transition phase of the receiving communication station such that occurrences of the transition phase of the receiving communication station lag occurrences of the transition phase of the source communication station by the synchronization offset X.

Each occurrence of the first information transfer phase of the source communication station starts with the clock period following the end of each occurrence of the transition phase of the source communication station.

Returning to FIG. 1, the synchronizer for the communication system segment according to the present invention comprises, in part, a source station time counter 66 and a receiving station time counter 68. In a preferred embodiment of the invention, the source station time counter 66 has a value equal to the number of clock periods of the system clock which have elapsed from a starting time. The receiving station time counter 68 has a value equal to the value of the source station time counter 66 minus the synchronization offset X.

In order to control the phases of the data source 12, the transition buffer 14, and the data receiver 40, phase logic circuits 70 and 72 are provided. Phase logic circuit 70 receives a counter value from the source station time counter 66 and outputs control signals to data source 12, input selection circuit 16, and transition buffer 14. When the count of the source station time counter 66 reaches pre-programmed values, a control signal from phase logic circuit 70 to the data source 12 selects the first information transfer phase, the second information transfer phase, or the transition phase. A control signal from phase logic circuit 70 to the input selection circuit 16 selects either the data source or the transition buffer for connecting to the transmit register 44. A control signal from phase logic circuit 70 to the transition buffer 14 causes the transition buffer to operate in either "first-in, first-out" mode, or "suspend" mode.

Phase logic circuit 72 receives a count from tile receiving station time counter 68 and outputs a control signal to the data receiver 40. When the count in receiving station time counter 68 reaches pre-programmed values, the phase logic circuit 72 selects the first information transfer phase, the second information transfer phase, or the transition phase.

Figure 5:
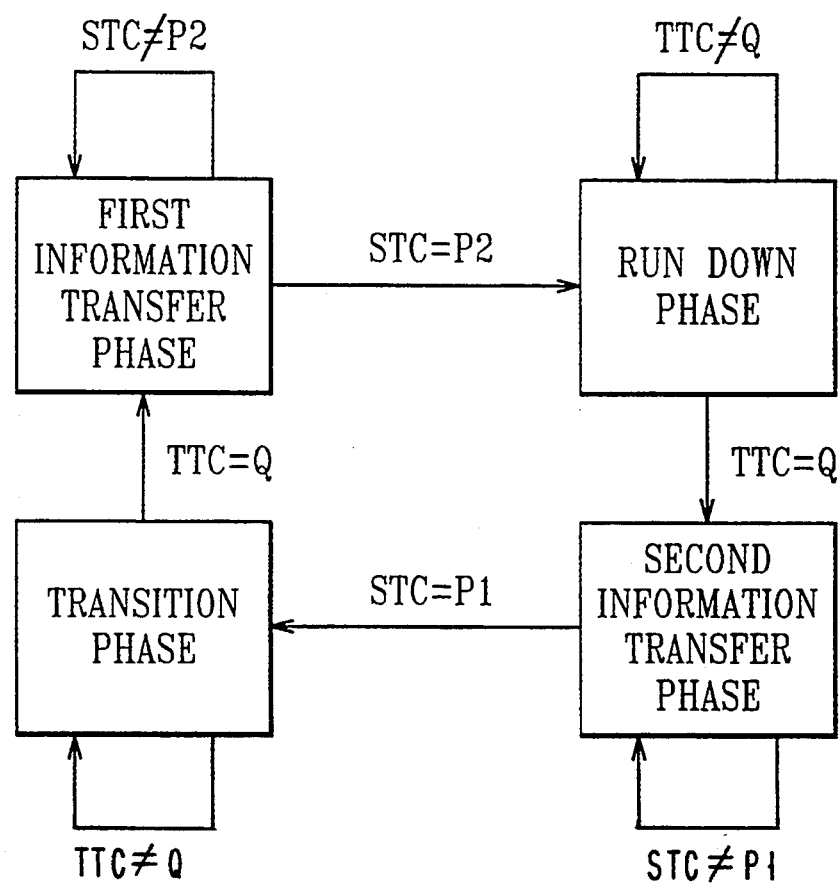
FIG. 5 is an example of a state diagram for a phase logic circuit.

FIG. 5 is an example of a state diagram for the phase logic circuits 70 and 72. Starting ill the first information transfer phase, the phase logic circuit remains in this phase so long as the value of the station time counter (STC) is not equal to a number P2. When the value of the station time counter (STC) is equal to a number P2, the phase logic circuit moves from the first information transfer phase to a run down phase. At the end of the first information transfer phase, the transition buffer 14 enters "suspend" mode, storing the last Q data signals output by the data source 12. At the same time, a transition time counter (TTC) is initialized at zero.

The phase logic circuit remains in the run down phase for Q clock cycles. In this example, no data signals are output or received by either the source communication station or by the receiving communication station during the run down phase. By choosing a value of Q greater than or equal to the number of clock cycles required for a signal to travel down tile communication line, the communication line is cleared of data signals during the run down phase.

When the value of the transition time counter (TTC) reaches (Q−1), the phase logic circuit ends the run down phase, and moves to the second information transfer phase. The phase logic circuit remains in the second information transfer phase so long as the value of the station time counter (STC) is not equal to a number P1. When the value of the station time counter (STC) is equal to P1, the phase logic circuit moves from the second information transfer phase to a transition phase. At the same time, the transition time counter (TTC) is initialized at zero.

The phase logic circuit remains in the transition phase for Q clock cycles. In this example, no data signals are output or received by either the data source 12 or the data receiver 40 during the transition phase. However, the transition buffer 14 sequentially outputs Q data signals onto the communication line 42 during the transition phase. By choosing a value of Q greater than or equal to the number of clock cycles required for a signal to travel down the communication line 42, the communication line 42 is restored to its state existing at the end of the immediately prior occurrence of the first information transfer phase.

When the value of the transition time counter (TTC) reaches (Q−1), the phase logic circuit ends the run down phase, and moves from the transition phase to the first information transfer phase.

The communication system segment according to the invention has a latency K equal to the number of clock periods of the system clock 10 for a data signal to travel from the output of the data source 12 to the input of the data receiver 40. The synchronization offset X between the source communication station 150 and the receiving communication station 200 is greater than or equal to the latency K of the communication system segment minus the number Q of data signals stored in the transition buffer 14, and is less than or equal to the latency K of the communication system segment.

Each data signal on the communication line 42 occupies a data signal length on the communication line. The communication line 42 has a length from the input of the communication line to the output of the communication line of K′ data signal lengths. The latency K of the communication system segment is greater than or equal to K′.

As shown in FIG. 1, the output of input selection circuit 16 is connected to the input of transition buffer 14. During the transition phase of the source communication station 150, phase logic circuit 70 provides a control signal to the input selection circuit 16 to connect the input of transition buffer 14 to the output of transition buffer 14. Consequently, during the transition phase the transition buffer 14 re-stores the data signals output from the transition buffer.

Figure 6:
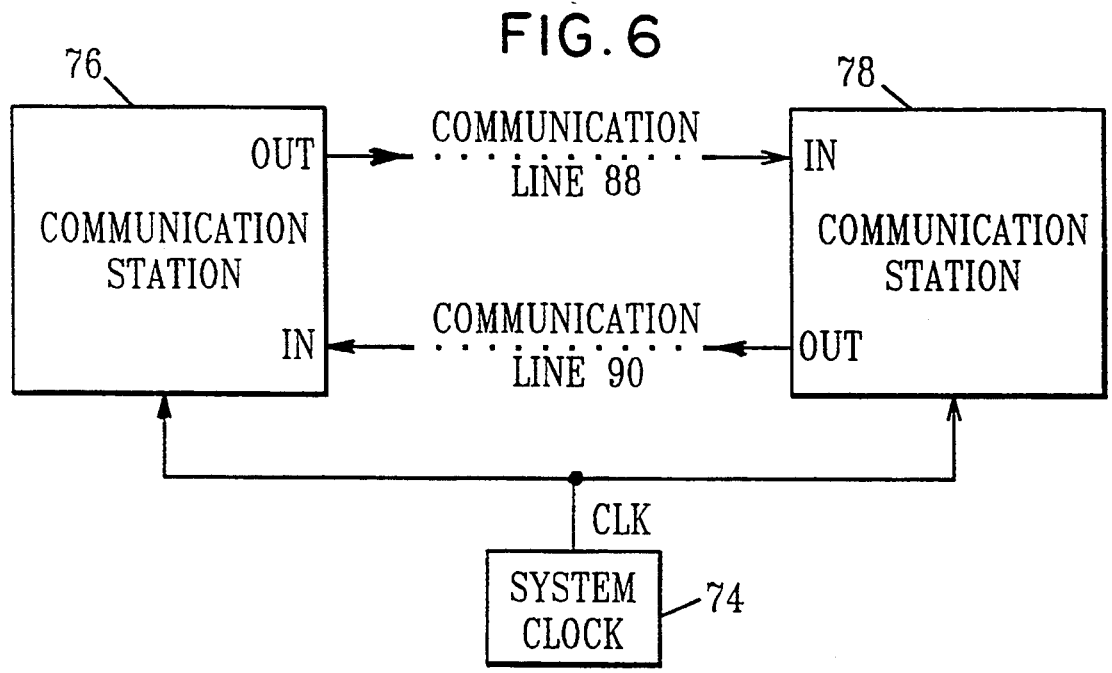
FIG. 6 is a block diagram of an example of a full duplex communication system stage according to the present invention.

FIG. 6 is a block diagram of an example of a full duplex communication system stage according to the present invention. The communication system stage comprises a system clock 74. The system clock 74 generates a clock signal each clock period. The communication system stage further comprises first and second communication stations 76 and 78.

Figure 7:
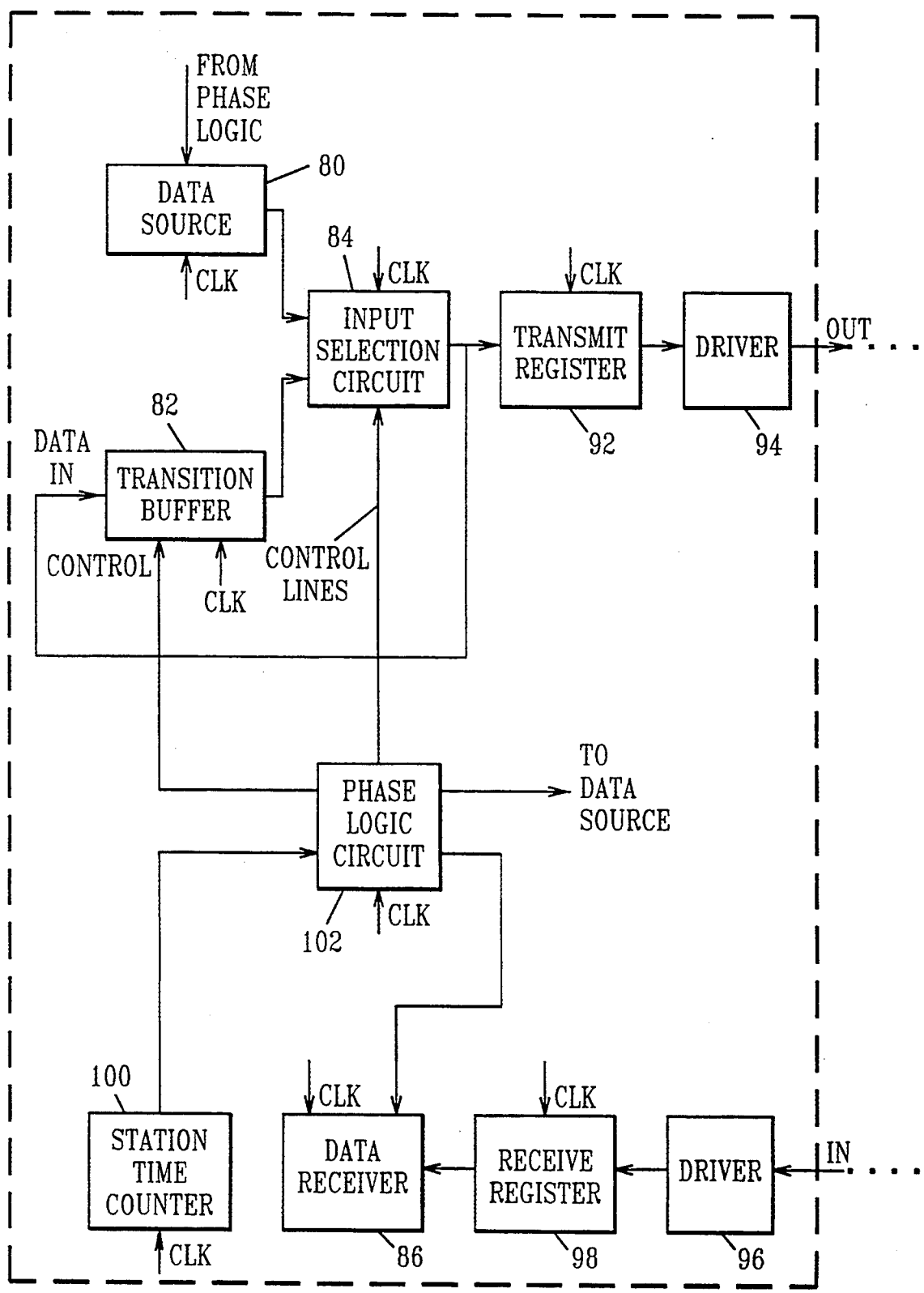
FIG. 7 is a block diagram of all example of a communication station for the communication system stage of FIG. 6.

FIG. 7 is a block diagram of all example of a communication station for the communication system stage of FIG. 6. Each communication station 76 and 78 of FIG. 6 comprises a data source 80. The data source has an output for sequentially outputting a series of data signals during a series of clock periods. Each data source 80 outputs one data signal from the series during each clock period.

Each communication station 76 and 78 further comprises a transition buffer 82 having an input connected to the output of the data source 80. As shown in FIG. 7, the input of transition buffer 82 is connected to the output of data source 80 by way of input selection circuit 84. Each transition buffer 82 has a first-in, a first-out mode ill which the transition buffer stores a series of Q data signals output from the data source during the most recent Q clock periods, where Q is an integer greater than zero.

Each communication station also comprises a data receiver 86. Each data receiver 86 has an input for sequentially inputting a series of data signals during a series of clock periods. Each data receiver inputs one data signal from the series during each clock period.

Returning to FIG. 6, the communication system stage further comprises a first communication line 88 having an input connected to the output of the data source of the first communication station 76, and having an output connected to the input of the data receiver of the second communication station 78. The first communication line 88 propagates data signals from the input of the first communication line to an output of the first communication line.

A second communication line 90 has an input connected to the output of the data source of the second communication station, and has an output connected to the input of the data receiver of the first communication station 76. The second communication line 90 propagates data signals from the input of the second communication line to an output of the second communication line.

As shown in FIG. 7, the input of each communication line is connected to the output of a data source by way of transmit register 92 and driver 94. The output of each communication line is connected to the input of a data receiver by way of driver 96 and receive register 98.

Each communication station 76 and 78 has a first information transfer phase and has a second information transfer phase different from the first information transfer phase. The system further comprises a synchronizer for synchronizing occurrences of the first information transfer phase of the first communication station with occurrences of the first information transfer phase of the second communication station, and for synchronizing occurrences of the second information transfer phase of the first communication station with occurrences of the second information transfer phase of the second communication station to a synchronization offset X equal to a number of clock periods of the system clock by which occurrences of each phase of the second communication station lag occurrences of the corresponding phase of the first communication station.

During occurrences of the first information transfer phase of a communication station, the transition buffer of the communication station operates in the first-in, first-out mode.

Each communication station 76 and 78 also has a transition phase in which the data source 80 does not output data signals, and in which the data receiver 76 does not input data signals. During the transition phase of the first communication station 76, the output of the transition buffer 82 of the first communication station 76 is connected to the input of the first communication line 88, The Q data signals in the transition buffer 82 of the first communication station 76 are output from the transition buffer 82 in an order which is the same as the order in which the Q data signals were output from the data source 80 of the first communication station 76 to the transition buffer 82 of the first communication station 76.

During the transition phase of the second communication station 78, the output of the transition buffer 82 of the second communication station 78 is connected to the input of the second communication line 90. The Q data signals in the transition buffer 82 of the second communication station 78 are output from the transition buffer 82 in an order which is the same as the order in which the Q data signals were output from the data source 80 of the second communication station to the transition buffer 82 of the second communication station 78.

The synchronizer synchronizes occurrences of the transition phase of the first communication station 76 with occurrences of the transition phase of the second communication station 78 such that occurrences of the transition phase of the second communication station 78 lag occurrences of the transition phase of the first communication station 76 by the synchronization offset X.

Each occurrence of the first information transfer phase of a communication station starts with the clock period following the end of each occurrence of the transition phase of the same communication station.

Returning to FIG. 7, the synchronizer may comprise, for example, a station time counter 100. In a preferred embodiment of the invention, a first station time counter for the first communication station 76 has a value equal to the number of clock periods of the system clock 74 which have elapsed from a starting time. A second station time counter for the second communication station 78 has a value equal to the value of the first station time counter minus the synchronization offset X.

Each communication station further comprises a phase logic circuit 102 for controlling the phases of the data source 80, the transition buffer 82, and the data receiver 86. The phase logic circuit 102 receives a count from the station time counter 100. At pre-programmed counter values, the phase logic circuit 102 outputs control signals to the data source 80, the transition buffer 82, the input selection circuit 84, and the data receiver 86.

The communication system stage has a first latency K1 equal to the number of clock periods of the system clock 74 for a data signal to travel from the output of the data source of the first communication station 76 to the input of the data receiver of the second communication station 78. The communication system stage has a second latency K2 equal to the number of clock periods of the system clock for a data signal to travel from the output of the data source of the second communication station 78 to the input of the data receiver of the first communication station 76.

The quantity (K1−X) equal to the first latency K1 of the communication system stage minus the synchronization offset X between the first communication station 76 and the second communication station 78 (a) is greater than the larger of zero or (K1+K2−Q), where Q is the number of data signals output from each transition buffer during the transition phase, and (b) is less than the smaller of (K1+K2) or Q.

Each data signal on a communication line occupies a data signal length on the communication line. The first communication line 76 has a length from the input of the first communication line to the output of the first communication line of K1′ data signal lengths. The second communication line 78 has a length from the input of the second communication line to the output of the second communication line of K2′ data signal lengths. The latency K1 of the communication system stage is greater than or equal to K1′. The latency K2 of the communication system stage is greater than or equal to K2′.

Returning to FIG. 7, the input of transition buffer 82 of a communication station is connected to its own output by way of input selection circuit 84 during the transition phase of the communication station. Therefore, during the transition phase the transition buffer re-stores the series of Q data signals output from itself.

The operation of each communication station of the invention is governed by a dedicated synchronous counter called the station time counter. The content of this counter is correspondingly called station time. The station time counter at each communication station is clocked by a dedicated image of a single, common oscillator called the system clock. Each image of the system clock is precisely the same frequency as all other images, but has an arbitrary and unknown displacement in time relative to the particular image seen by any other image. With station time being the sole arbiter of action at each station, each phase of station operation ends, and another phase begins, at a pre-established station time. In an embodiment of the invention, a particular value of phase-end-time for each of the two information transfer phases may be established at each station by a controlling processor during each service phase.

Figure 8:
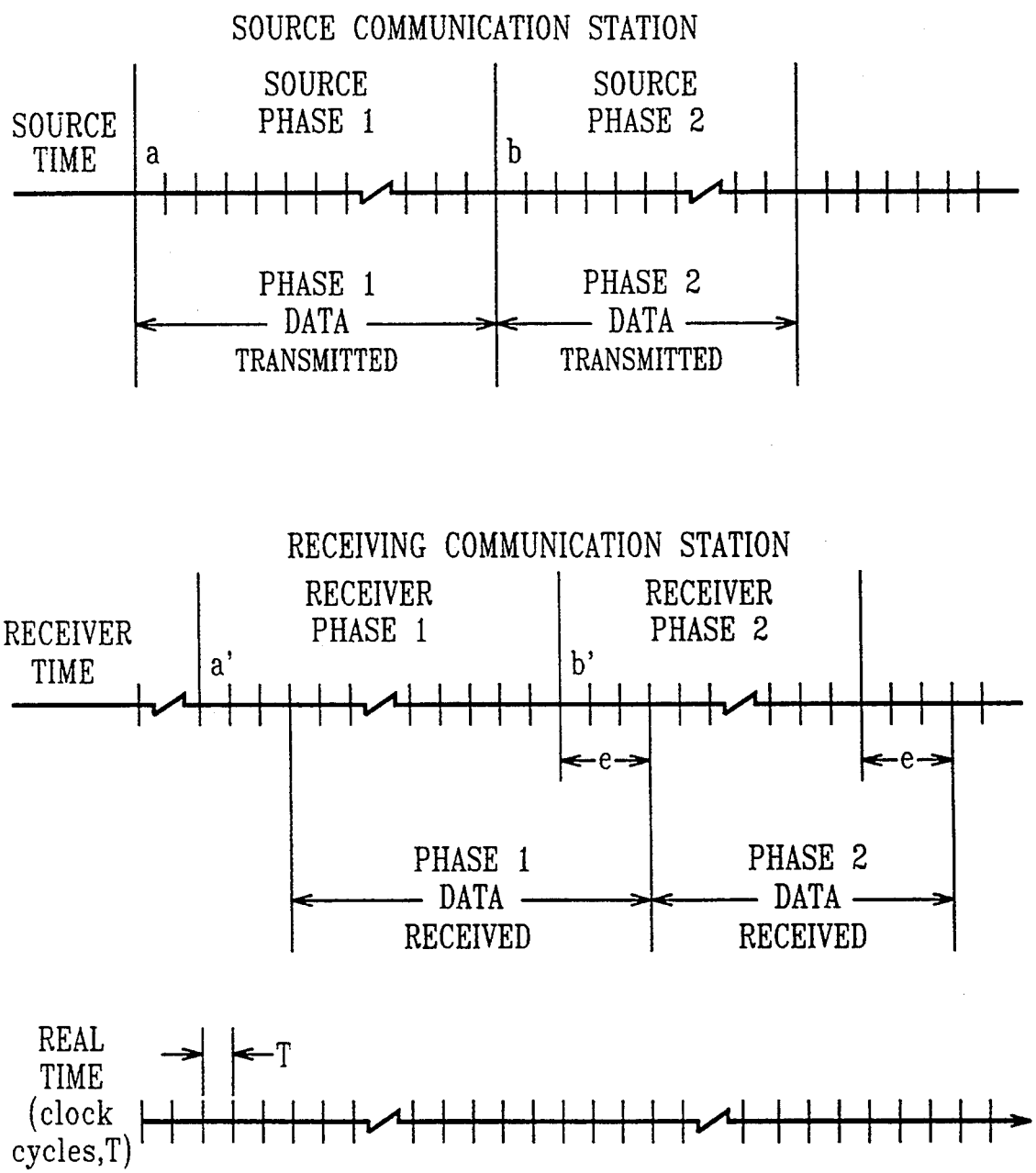
FIG. 8 schematically shows an example of the temporal relationships between two information transfer phases of a data source, and the same two information transfer phases of a data receiver located at a distance from the data source.

The characteristics of a phase are schematically illustrated in FIG. 8. The source communication station signal timing diagram shows the correspondence of data and phase for two unrelated phases, Source Phase 1 and Source Phase 2, as a function of time. At the sending station, each phase and its data are precisely aligned. Data transmission for each phase begins and ends precisely at the corresponding phase boundaries. The station times corresponding to the first clock cycle at each of the two phases are designated a and b as shown.

The task of the receiving station, namely to detect and correctly interpret the incoming data, is complicated by the differing transmission characteristics of the two phases. The nature of this complication can be understood by remembering that the operation of the receiving station is governed by its own station time. The receiving station is designed to change its operating phase at precisely the same station time as does the sending station. All stations of the system are designed to operate this way. Thus, in the receiving communication station signal timing diagram of FIG. 8, which describes the data/phase relationship at the receiving station, the station times a' and b' (typically a'=a and b'=b) are seen to have the same significance as they did at the sending station. They mark the start of Receiver Phase 1 and Receiver Phase 2, respectively.

However, the real time at which each of these transitions occurs at the receiving communication station may differ from the real time of arrival of the corresponding phase-related data. This is because station time in general is not equal to the real time. Rather, the station time depends on the value to which the corresponding station time counter has been initialized. The result, therefore, is that incoming data, as observed at the receiving communication station may arrive shifted in time relative to its corresponding phase.

In the receiving communication station signal timing diagram of FIG. 8, for example, each Receiver Phase is shown exposed to e cycles of information associated with the preceding phase. This shift, called exposure (e), is what gives rise to a "phase transition problem". The phase transition problem, is that any "exposed" data will, unless properly accounted for, be misinterpreted by the receiving station which is operating in a different phase. This misinterpretation will lead to a fault condition.

The specific amount of exposure (e) may be shown to be the difference between a parameter called segment latency (k) and another parameter called segment offset (x) according to the formula $$e = k - x. \qquad [1]$$

Figure 9:
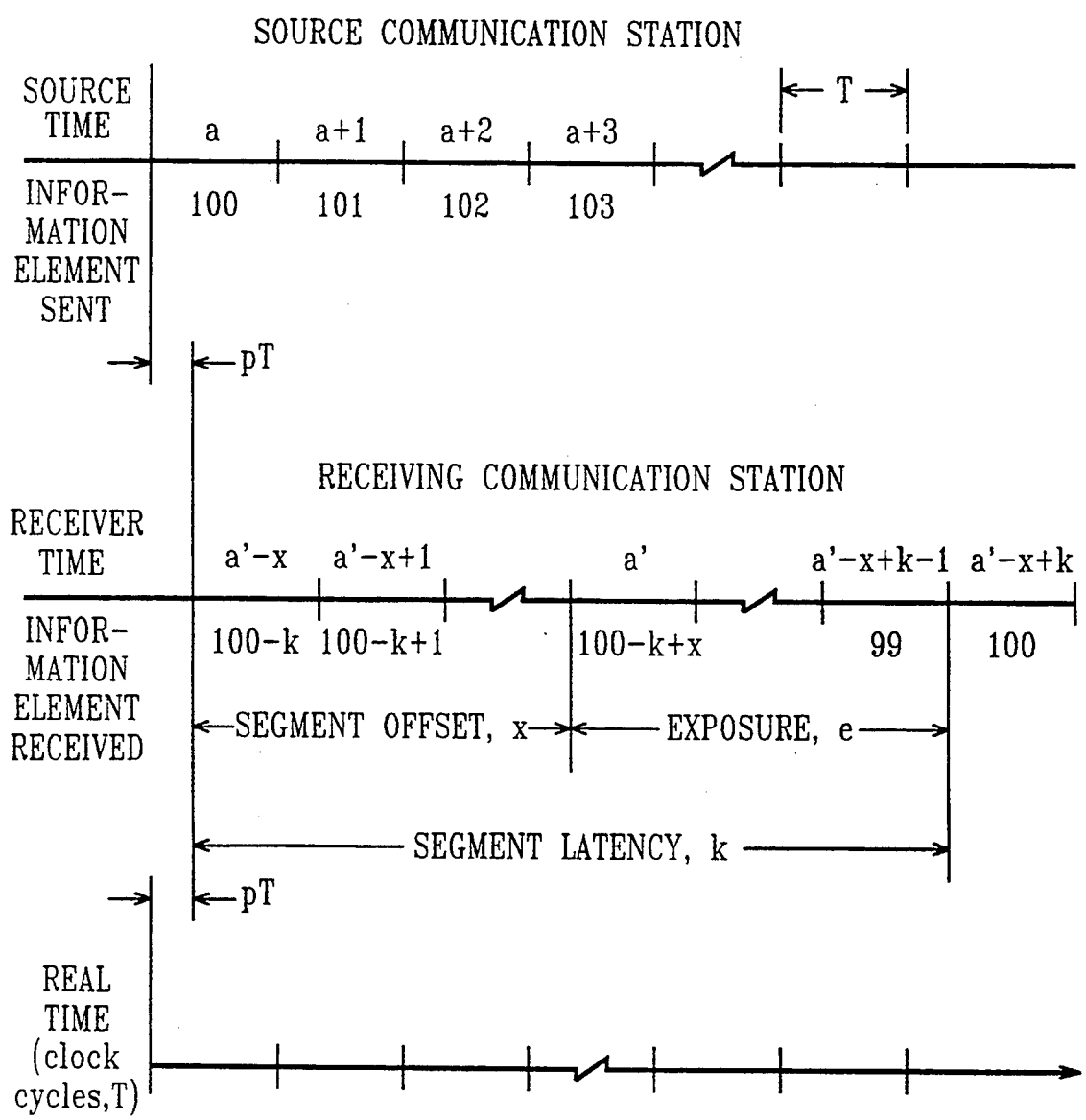
FIG. 9 schematically shows the definitions of segment latency, segment offset, and segment exposure in a communication system segment according to the invention.

These integer parameters are precisely defined in the signal timing diagrams of FIG. 9. The segment latency, k, is equal to the number of clock periods of the system clock for a data signal to travel from the output of the data source of the source communication station to the input of the data receiver of the receiving communication station. The segment offset, x, is equal to the number of clock periods of the system clock by which occurrences of each phase of the receiving communication station lag occurrences of the corresponding phase of the source communication station.

The term "segment" refers to the physical elements of the simplex transmission path from sender to receiver. Segment latency k is associated with the time it takes for an information element to move through the segment from the data sender (source communication station) to the data receiver (receiving communication station). An information element may be a bit, a byte, or any other defined collection of bits. The segment latency thus depends upon the physical characteristics of the transmission path. It cannot, therefore, have a negative value.

The segment offset x is associated with the difference in station time between the data sender and the data receiver at (essentially) the same real time. The segment offset is a parameter that, unlike latency, is determined by the values to which the station time counters are initialized. The offset can therefore be positive, negative, or zero. It may be noted that the integer definitions of k and x are independent of the clock phase difference that exists between the sender and the receiver (denoted by the parameter p in FIG. 9). This clock phase difference is adjusted prior to setting the station time counters in order to establish stable set up and hold times for all signals.

Exposure e is a parameter that can be readily measured and/or established by means of the sending station (the source communication station) even though the individual values of latency and offset may not be precisely known. Thus, in order for the receiver to capture the incoming data in precise synchronization with its corresponding phase, it is only necessary to initialize the station time counter of the receiving station so that it observes a zero exposure. In other words, it is only necessary to make the station time at the receiver lag that at the sender by precisely the amount of the segment latency k. This can be readily accomplished by sending a message to the receiver containing the value of the source station time counter at the time the message is transmitted from the data source, and then setting the receiving station time counter to the value in the received message.

The preceding solution to the phase transition problem applies in the context of an isolated communication segment. In practice, a segment is but one of a multitude of segments that make up a switching network. Moreover, in practice all stations generally act as both a source and a sink for more than one communication segment. Thus, a particular initialization of the station time counter at one end of any communication segment will not, in general, satisfy the exposure requirements for another segment that begins or ends at the same station.

To illustrate, consider the case of two segments that share the resources of the same two stations to move information in opposite directions. One segment moves information elements from the first station to the second station, and the other segment moves information elements from the second station to the first station. The requirement that the receiving station time counter lag the sending station time counter applies in full measure to each of the two segments. Thus, for proper operation of the first segment, the station time counter of the second station must lag the station time counter of the first station. For proper operation of the second segment, the station time counter of the first station must lag the station time counter of the second station by an amount corresponding to the segment latency.

Clearly, both of these requirements cannot be satisfied concurrently. Consequently, at least one of ally pair of duplexed segments must always operate with positive exposure. The segment operating with positive exposure cannot therefore, function properly unless appropriate means are introduced to accommodate the phase transition problem. The problem is global. It exists at all stations that source or sink more than a single transmission segment.

Any general resolution of the phase transition problem must enable two separate segments to move information concurrently in opposite directions between the same two stations. Two segments operating in this manner are therefore operating with equal but opposite segment offsets. One of these offsets therefore negative, or else both are zero. Referring to Equation 1, this means that the corresponding value of segment exposure must be positive. Thus, any general resolution of the phase transition problem must involve finding a way for a segment to tolerate information phase change in the presence of positive exposure.

With the above objective in mind, imagine that Receiver Phase 2 of FIG. 8 is designed to ignore all incoming information elements. Exposure would not then be disruptive, at least from the point of view of Receiver Phase 2. There remains, however, the matter of information element loss from Phase 1. The e information elements exposed to Receiver Phase 2 were intended to be received by Phase 1. If they are ignored by Receiver Phase 2, then all that information will be lost, making the special property of Receiver Phase 2 useless. However, if the last e information elements of Phase 1 are saved by the sender and later re-transmitted using a specialized phase that immediately precedes the next instance of Source Phase 1, these e information elements would be re-exposed at the receiver, this time not to a foreign phase, but rather to the next instance of the phase to which they belong. In this case, the property of Receiver Phase 2 to ignore incoming information elements would then remain useful. It would allow Receiver Phase 1 to terminate without being disruptive.

What is needed, therefore, are transition phases that separate the various information transfer phases from one another, rendering each of them non-disruptive to the following information transfer phase. Each transition phase supplies the immediately following information transfer phase with the information elements that were not captured during the preceding instance of the same information transfer phase.

Specifically, the phase transition problem is resolved by introducing a transition phase between successive instances of the various information transfer phases that comprise the continuous transfer of information from a sending station to a receiving station. Each of these transition phases has the following properties. It is associated with a single information transfer phase and immediately precedes each instance of that phase. It is of duration Q clock cycles. It is associated with a dedicated transition buffer located in the sending station that buffers a duplicate of the last Q information elements transmitted during each instance of the corresponding information transfer phase. As executed at the sending station, the transition phase causes the entire content (Q information elements) of the associated transition buffer to be transmitted to the receiving station. As executed at the receiving station, it ignores all incoming information elements.

Figure 10:
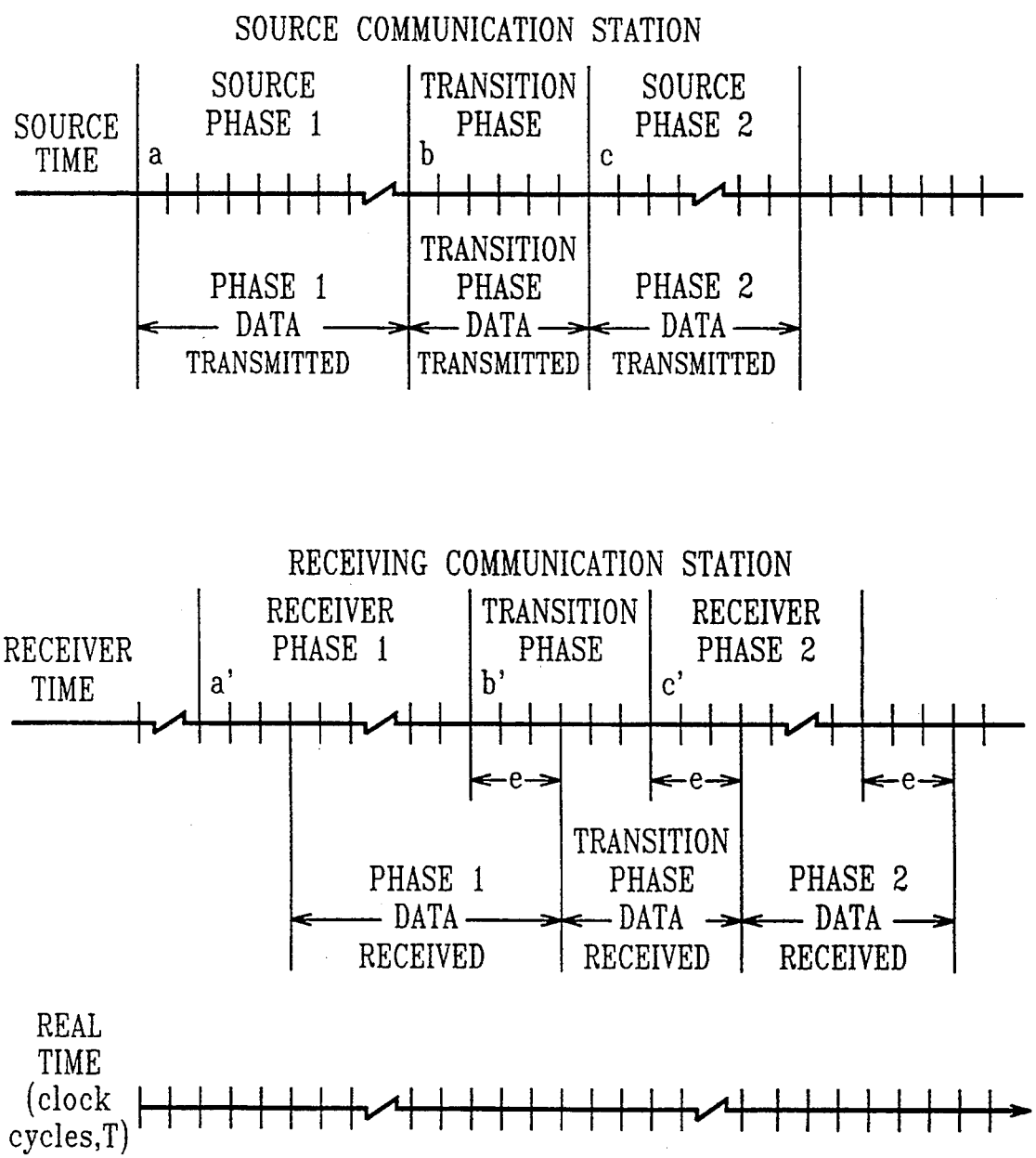
FIG. 10 schematically shows an example of the temporal relationships between two information transfer phases and a transition phase of a data source, and the corresponding phases of a data receiver located at a distance from the data source.

Thus, with the introduction of a transition phase between the phase instances shown in FIG. 8, the transmit receive signal timing diagrams of the modified information transfer process are as shown in FIG. 10. In FIG. 10, the transition phase is associated with an instance of Phase 2. Given the properties described above, the execution of the transition phase at the sending station causes the content of the Phase 2 buffer register (transition buffer) to be transmitted in precise correspondence with the station time counter of the sending station. This transmission is preceded by an instance of Source Phase 1, and is followed by an instance of Source Phase 2.

At the receiver, each of these phases exhibit identical exposure e. The last e information elements transmitted by Phase 1 are exposed to the transition phase. The last e information elements transmitted by the transition phase are exposed to Receiver Phase 2. Given the properties of the transition phase at the receiver, however, its exposure to the information elements of Phase 1 is harmless. The receiver simply ignores them. Also, by virtue of the fact that the Q information elements transmitted by the transition phase are precise duplicates of the last Q information elements of the preceding instance of Source Phase 2, the Receiver Phase 2 is exposed to precisely the same information elements that its predecessor Receiver Phase 2 lost, thereby preserving the overall continuity of Receiver Phase 2.

All transition phases operate in this way and, given their above-defined properties, it may be shown that transition phases enable continuous, simplex, synchronous, and sequenced-phase information transfer between two communicating stations to be achieved over a range of exposures satisfying Equation 2.

$$0 \leq e \leq L(Q, Qi_{min}) \quad [2]$$

In Equation 2, Q is the common duration of each transition phase, $Qi_{min}$ is the duration of the shortest instance of all information transfer phases observed by the two communicating stations, and the notation $L(Q, Qi_{min})$ denotes the lesser of Q and $Qi_{min}$.

The range of exposures defined by Equation 2 for any given value of segment latency is therefore synonymous with a range of acceptable values of segment offset extending from $x=k$ to $x=k-L(Q, Qi_{min})$. Thus, by making $L(Q, Qi_{min})$ sufficiently large, the desired objective of operating with negative as well as positive offsets can be realized.

It may be now be observed that transition phases have the following significance. They transform a situation wherein only a single, positive value of segment offset (precisely equal to the segment latency) can accommodate phase transition, to an arbitrarily large range of accommodation. Within that range, a segment can operate not only at an offset $x=k$ or $x=-k$ (if $L(Q, Qi_{min})$ is sufficiently large), but also at integer values between $-k$ and $+k$. As will be described below, this broadening of the range of operation of a segment makes it possible to create an entire switching network using segments as the elemental building block.

If the duration of any information transfer phase is less than the exposure to which the segment has been initialized, that phase will not be able to absorb all of the information elements presented by the precursor transition phase. As a result, information will be irrevocably lost. By specifying that the exposure be less than the duration of the shortest instance of all information transfer phases, Equation 2 rules out this possibility. However, this is a serious limitation whenever $Qi_{min}$ is less than Q in that it reduces the magnitude of the upper limit on the exposure given by Equation 2, thereby wasting the resources of the transition phase and reducing the range of segment latency for which information transfer can be achieved in either direction between the same two stations.

Fortunately, this limitation can be removed by broadening the use of the transition buffer so that it also buffers a duplicate of the Q information elements transmitted during each execution of the associated transition phase. This is called restoration refilling of the transition buffer. Using restoration refilling, the resulting content of each transition buffer upon termination of the associated transition phase is identical with its content at the beginning of that phase. This property of restoration refilling is a necessary condition for allowing any instance of any information transfer phase to have any duration whatsoever, thereby relaxing the constraint given by Equation 2 to the form $$0 \leq e \leq Q \qquad [3]$$

Any instance of an information transfer phase i having a duration Qi for which $$Qi < e \qquad [4]$$

is called a short phase, Restoration refilling thus permits short-phase operation at any time, without reducing the range on the exposure e afforded by the transition phases.

Equations 2 and 3 apply only to simplex information transfer using a single segment. Two such segments, moving information elements in opposite directions between the same two stations would therefore provide means for full duplex information transfer between these stations. A pair of segments (along with their associated transition buffers) used in this way is called a transmission stage and is illustrated in FIG. 6. Stage elements belonging to each of the two duplex stations may be called a port. A port thus comprises at least a data receiver, a data source, and one or more transition buffers. With this terminology, a transmission stage may be alternatively defined simply as a full duplex entity comprising two communicating ports.

The two communicating ports of a transmission stage may be called correspondent ports. Correspondent ports need not be identical. However, the receive register at each port must be compatible with the transmit register of its correspondent port. The transmit registers of correspondent ports may be different. That is, the information elements carried by one segment of a transmission stage may be quite different in size and logical significance from those carried by the other segment.

A transmission stage containing two segments A and B moving information elements in opposite directions between two ports, may be characterized by the following parameters. Segment A has a segment latency $k_A$, a segment offset $x_A$, and a segment exposure $e_A \equiv k_A - x_A$. Segment B has a segment latency $k_B$, a segment offset $x_B = -x_A$, and a segment exposure $e_B \equiv k_B - x_B$. The transmission stage also has a stage latency $K \equiv k_A + k_B$, and a stage offset $d \equiv x_A = -x_B$.

Figure 11:
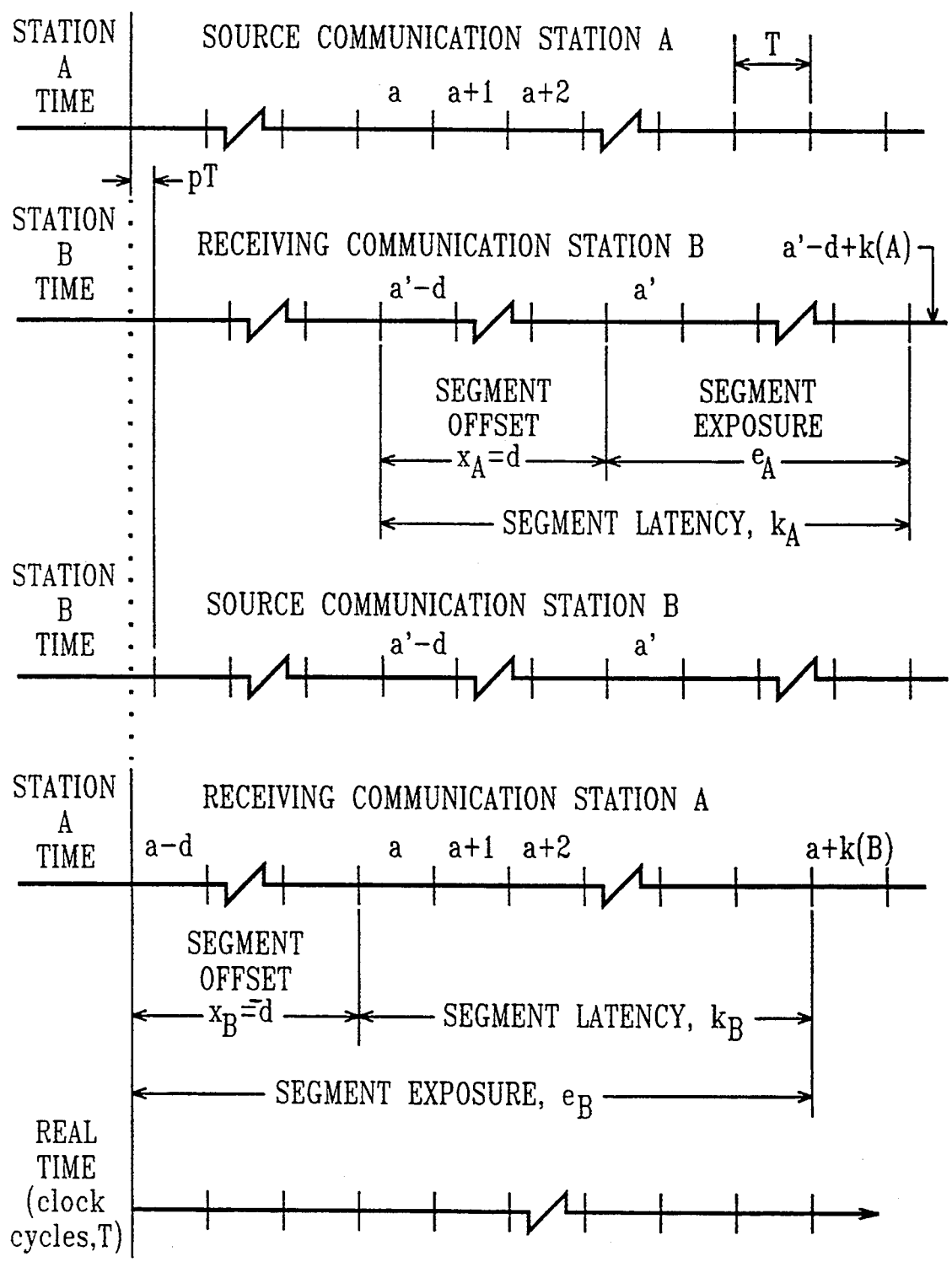
FIG. 11 schematically shows the definitions of segment latency, segment offset, and segment exposure for a full duplex transmission stage having two segments transmitting information elements in opposite directions.

As shown in the source communication station and receiving communication station signal timing diagrams of FIG. 11, the Segment A latency $k_A$ is equal to the number of clock periods of the system clock for a data signal to travel from the output of Source Communication Station A to the input of Receiving Communication Station B. The Segment B latency $k_B$ is equal to the number of clock periods of the system clock for a data signal to travel from the output of the Source Communication Station B to the input of the Receiving Communication Station A. The Segment A offset $x_A$ is equal to the number of clock periods of the system clock by which occurrences of each phase of the Receiving Communication Station B lag occurrences of the corresponding phase of the Source Communication Station A. The Segment B offset $x_B$ is equal to the number of clock periods of the system clock by which occurrences of each phase of the Receiving Communication Station A lag occurrences of the corresponding phase of the Source Communication Station B.

Using these parameters, using the fact that $$e_A + e_B = K, \qquad [5]$$

and by taking into account the constraints imposed by Equation 2, it may be shown that continuous, full duplex, synchronous, sequenced-phase information transfer can be achieved by a transmission stage provided that $$G(0, K-Q) \leq e_A \leq L(K,Q) \qquad [6]$$

where $$Q \equiv L(Q, Qi_{min}). \qquad [7]$$

In Equations 6 and 7, the notation G(p, q) and the notation L(p, q) denote the greater and the lesser, respectively, of the quantities p and q enclosed within the parentheses. Given any value of $e_A$ satisfying Equation 6, the corresponding value of $e_B$ will automatically satisfy Equation 2 and need not be given further consideration. The corresponding value of $e_B$ may be calculated using Equation 5.

Equation 6 gives the system analyst an opportunity to view an entire network of duplex segments as a collection of stages, rather than as a collection of segments, thereby simplifying the task of network analysis and initialization by essentially a factor of two. Since switching networks can comprise a large number of duplexed segments, this degree of simplification is important.

In Equation 6, $Qi_{min}$ is again an unwanted constraint because values for which $Qi_{min} < Q$ not only reduce the upper limit on $e_A$, but also increase the lower limit, as well, thereby reducing the acceptable range on $e_A$. Fortunately, however, restoration refilling is applicable to each segment of the stage, and using this expedient Equation 6 reduces to $$G(0, K-Q) \leq e_A \leq L(K,Q). \qquad [8]$$

Restoration refilling thus permits unrestricted short phase operation of a transmission stage just as it did for a single segment.

Figure 12:
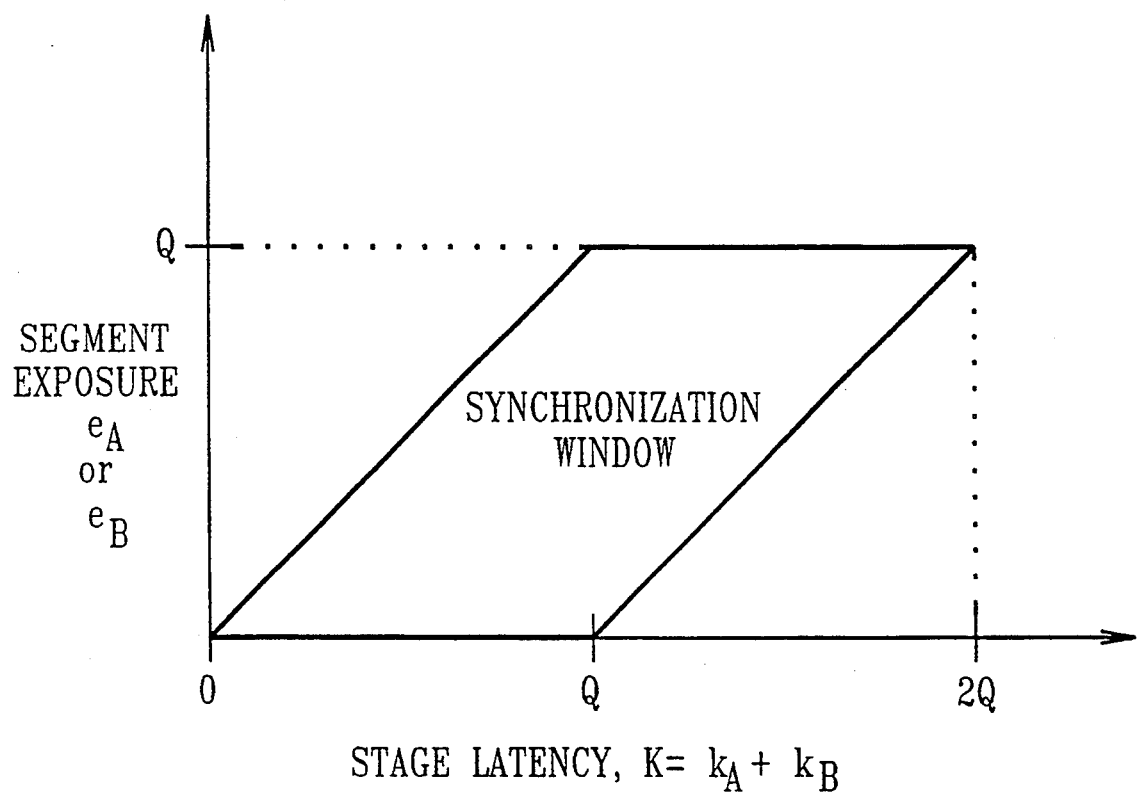
FIG. 12 is a graphical representation of the synchronization window of a full duplex transmission stage according to the invention.

To appreciate the significance of Equation 8, it can be represented graphically. The representation of Equation 8 shown in FIG. 12 reveals that the desired full duplex operation of a transmission stage is characterized by a finite window of operation, called a synchronization window, extending over a range of stage latencies given by $$0 \leq K \leq 2Q = K_{max}, \qquad [9]$$

and extending over a range of segment exposures, e, dependent only upon the stage latency ($K = k_A + k_B$). The range of segment exposures increases linearly from zero at $K=0$ to a peak value of Q at $K=Q$. Thereafter, the range of exposures decreases linearly, returning to zero at $K=2Q$. Outside of this synchronization window, full duplex operation is not possible.

Thus, the duplexing of segments generally reduces the exposure range at which they can operate relative to the range otherwise available to the segments individually, namely the range defined by Equation 3. Only for $K=Q$ does this reduction not occur. Moreover, for any given value of K, the range on $e_A$ (and $e_B$) is fixed and precisely calculable, independent of the relative values of $k_A$ and $k_B$.

The synchronization window also reveals that for stage latencies $K<Q$, the transition buffers can never be fully utilized (the exposure must always be less than Q). For stage latencies $Q \leq K < 2Q$, the transition buffers may or may not be fully utilized. At $K=2Q$, the transition buffers are always fully utilized. Interestingly, exposure can never be zero for values of $K>Q$, and the lower bound on exposure increases steadily thereafter with K to a maximum value of $e=Q$ at $K=2Q$.

Thus, the desired full duplex operation of a transmission stage can be achieved for any value of K satisfying Equation 9, provided that the settings of the station time counters at each end of the stage achieve an exposure that lies within the range of exposures defined by Equation 8. Achieving that exposure becomes more and more exacting as stage latency approaches either extreme of its range, but the direct procedure for setting the station time counters of a transmission stage is always the same. Working from either end of the stage, the station time counter of a first station is set. Then, the stage latency $K=k_A=k_B$ is determined by measuring the round trip signal propagation time. Next, a value of the exposure $e_A$ within the synchronization window (FIG. 12) is selected for that value of K. Last, the station time counter of the second station is set so that the capture time $a'$ equals the reference time a plus the desired exposure:

$$a' = a + e \qquad [10]$$

As described above, each instance of a continuous information transfer phase is preceded by an associated transition phase. Therefore, a separate transition buffer must be provided for each continuous information transfer phase. It is also possible to multiplex discrete information transfer phases with continuous information transfer phases. A discrete information transfer phase is one in which each occurrence of the information transfer phase is independent of all other occurrences of the information transfer phase.

A discrete information transfer phase does not require the use of a transition buffer. A discrete information transfer phase must not, however, expose information elements as it terminates. In practice, this means that a discrete information transfer phase should not transmit information elements later than Q cycles before the end of the discrete information transfer phase. Because a discrete information transfer phase is not preceded by a transition phase, it must be preceded instead by a run-down phase in which a series of Q nulls are sent from the data source to the data receiver.

The flip-flop circuits contained in the communication apparatus according to the invention may be clocked, for example, by the rising edge of each clock signal. By choosing minimum signal delays between adjacent flip-flop circuits, a potential race-around problem is avoided.

We claim:
1. A communication system segment comprising:
a system clock having a clock period, said system clock generating a clock signal each clock period;
a source communication station comprising:
a data source having an output for sequentially outputting a first series of data signals during a first series of clock periods from the system clock, said data source outputting one data signal from the series during each clock period of the first series;
a transition buffer having an output, and having an input connected to receive outputs from the output of the data source, said transition buffer having a first-in, first-out mode in which the transition buffer stores a series of Q data signals output from the data source during the system clock's most recent Q clock periods, where Q is an integer greater than zero; and
the source communication station having a first source station information transfer phase, a second source station information transfer phase different from the first source station information transfer phase and a transition phase in which the data source does not output data signals;
a receiving communication station comprising a data receiver having an input for sequentially inputting a second series of data signals during a second series of clock periods from the system clock, said data receiver inputting one data signal from the series during each clock period of the second series;
the receiving communication station having a first receiving station information transfer phase during which the transition buffer of the source communication station operates in the first-in, first-out mode, a second receiving station information transfer phase different from the first receiving station information transfer phase and a transition phase in which the data receiver does not input data signals;
a communication line having an input connected to the output of the data source of the source communication station and having an output connected to the input of the data receiver of the receiving communication station;
a synchronizer for synchronizing of the first source station information transfer phase with the first receiving station information transfer phase, the first source station and the first receiving station information transfer phases being offset by a synchronization offset X, and for synchronizing of the second source station information transfer phase with the second receiving station information transfer phase, offset by the synchronization offset X, where the synchronization offset X equals a number of clock periods of the system clock by which each phase of the receiving communication station lags the corresponding phase of the source communication station;
wherein during the transition phase of the source communication station the output of the transition buffer is connected to the input of the communication line, and the Q data signals in the transition buffer are output from the transition buffer in an order which is the same as the order in which the Q data signals were output from the data source to the transition buffer; and
the synchronizer synchronizes the transition phase of the source communication station with the transition phase of the receiving communication station such that the transition phase of the receiving communication station lags occurrences of the transition phase of the source communication station by the synchronization offset X.

2. A communication system segment as claimed in claim 1, characterized in that the first source station information transfer phase starts with the clock period immediately following the transition phase of the source communication station.

3. A communication system segment as claimed in claim 2, characterized in that:
the communication system segment has a latency K equal to the number of clock periods of the system clock for a data signal to travel from the output of the data source to the input of the data receiver; and
the synchronization offset X between the source communication station and the receiving communication station is greater than or equal to the latency K of the communication system segment minus the number Q of data, signals stored in the transition buffer, and is less than or equal to the latency K of the communication system segment.

4. A communication system segment as claimed in claim 3, characterized in that:
each data signal on the communication line occupies a data signal length on the communication line;
the communication line has a length from the input of the communication line to the output of the communication line of K' data signal lengths; and
the latency K of the communication system segment is greater than or equal to K'.

5. A communication system segment as claimed in claim 4, characterized in that the synchronizer comprises:
a source station time counter having a value equal to the number of clock periods of the system clock which have elapsed from a starting time; and
a receiving station time counter having a value equal to the value of the source station time counter minus the synchronization offset X.

6. A communication system segment as claimed in claim 5, characterized in that in the transition phase of the source communication station, the transition buffer input is connected to the transition buffer output, and the transition buffer re-stores the series of Q data signals output from the transition buffer.

7. A communication system segment as claimed in claim 6, characterized in that the transition buffer is a first-in, first-out buffer.

8. A communication system segment as claimed in claim 7, characterized in that each data signal comprises two or more digit signals.

9. A communication system segment as claimed in claim 8, characterized in that each digit is a binary digit.

10. A communication system segment as claimed in claim 4, further comprising a transmit register connecting the output of the data source to the input of the communication line.

11. A communication system stage comprising:
a system clock having a clock period, the system clock generating a clock signal each clock period;
first and second communication stations, each communication station comprising:
a data source having an output for sequentially outputting a first series of data signals during a first series of clock periods from the system clock, each data source outputting one data signal from the first series during each clock period;
a transition buffer having an output and having an input connected to receive outputs from the output of the data source, each transition buffer having a first-in, first-out mode in which the transition buffer stores a series of Q data signals output from the data source during the system clock's most recent Q clock periods, where Q is an integer greater than zero; and
a data receiver having an input for sequentially inputting a second series of data signals during a second series of clock periods from the system clock, each data receiver inputting one data signal from the second series during each clock period;
a first communication line having an input connected to the output of the data source of the first communication station and an output connected to the input of the data receiver of the second communication station;
a second communication line having an input connected to the output of the data source of the second communication station and an output connected to the input of the data receiver of the first communication station;
each communication station having a first information transfer phase during which the transition buffer of the communication station operates in the first-in, first-out mode, a second information transfer phase different from the first information transfer phase and a transition phase in which the data source of the communication station does not output data signals, and the data receiver of the communication station does not input data signals;
the system further comprising a synchronizer for synchronizing the first information transfer phase of the first communication station with the first information transfer phase of the second communication station, for synchronizing the second information transfer phase of the first communication station with the second information transfer phase of the second communication station, with a synchronization offset X equal to a number of clock periods of the system clock by which each phase of the second communication station lag the corresponding phase of the first communication station, and for synchronizing the transition phase of the first communication station with the transition phase of the second communication station such that the transition phase of the second communication station lags the transition phase of the first communication station by the synchronization offset X;
wherein during the transition phase of the first communication station the output of the transition buffer is connected to the input of the first communication line, and the Q data signals in the transition buffer of the first communication station are output from the transition buffer in an order which is the same as the order in which the Q data signals were output from the data source of the first communication station to the transition buffer of the first communication station; and
wherein during the transition phase of the second communication station the output of the transition buffer of the second communication station is connected to the input of the second communication line, and the Q data signals in the transition buffer of the second communication station are output from the transition buffer in an order which is the same as the order in which the Q data signals were output from the data source of the second communication station to the transition buffer of the second communication station.

12. A communication system stage as claimed in claim 11, characterized in that the first information transfer phase of a communication station starts with the clock period immediately following the transition phase of the same communication station.

13. A communication system stage as claimed in claim 12, characterized in that:
the communication system stage has a first latency K1 equal to the number of clock periods of the system clock for a data signal to travel from the output of the data source of the first communication station to the input of the data receiver of the second communication station;
the communication system stage has a second latency K2 equal to the number of clock periods of the system clock for a data signal to travel from the output of the data source of the second communication station to the input of the data receiver of the first communication station; and
the quantity (K1−X) equal to the first latency K1 of the communication system stage minus the synchronization offset X between the first communication station and the second communication station (a) is greater than the larger of zero or (K1+K2−Q), where Q is the number of data signals output from each transition buffer during the transition phase, and (b) is less than the smaller of (K1+K2) or Q.

14. A communication system stage as claimed in claim 13, characterized in that:
each data signal on a communication line occupies a data signal length on the communication line;
the first communication line has a length from the input of the first communication line to the output of the first communication line of K1′ data signal lengths;
the second communication line has a length from the input of the second communication line to the output of the second communication line of K2′ data signal lengths;
the latency K1 of the communication system stage is greater than or equal to K1′; and
the latency K2 of the communication system stage is greater than or equal to K2′.

15. A communication system stage as claimed in claim 14, characterized in that the synchronizer comprises:
a first station time counter for the first communication station having a value equal to the number of clock periods of the system clock which have elapsed from a starting time; and
a second station time counter for the second communication station having a value equal to the value of the first station time counter minus the synchronization offset X.

16. A communication system stage as claimed in claim 15, characterized in that in the transition phase of a communication station, the input of the transition buffer of the communication station is connected to its own output, and the transition buffer re-stores the series of Q data signals output from itself.

17. A communication system stage as claimed in claim 16, characterized in that the transition buffer is a first-in, first-out buffer.

18. A communication system stage as claimed in claim 17, characterized in that each data signal comprises two or more digit signals.

19. A communication system stage as claimed in claim 18, characterized in that each digit is a binary digit.

20. A communication system stage as claimed in claim 14, characterized in that each communication station further comprises a transmit register connecting the output of the data source of the communication station to the input of a communication line.

* * * * *